United States Patent [19]

Dammeyer et al.

[11] Patent Number: 5,044,472
[45] Date of Patent: Sep. 3, 1991

[54] DUAL OPERATOR POSITION FOR MATERIAL HANDLING VEHICLE

[75] Inventors: Ned E. Dammeyer; Harold A. Stammen, both of New Bremen, Ohio

[73] Assignee: Crown Equipment Corporation, New Bremen, Ohio

[21] Appl. No.: 446,268

[22] Filed: Dec. 5, 1989

[51] Int. Cl.⁵ .............................................. B66B 9/20
[52] U.S. Cl. .................................... 187/9 R; 180/273; 414/630
[58] Field of Search ................. 187/9 R, 9 E, 1 R; 182/13, 14, 141; 180/273, 272, 287; 414/630, 631

[56] References Cited

U.S. PATENT DOCUMENTS

| | | | |
|---|---|---|---|
| 3,224,529 | 12/1965 | Gandolfo | 182/14 |
| 3,487,451 | 12/1969 | Fontaine | 180/273 |
| 4,398,618 | 8/1983 | Hansen | 180/273 |

Primary Examiner—Robert P. Olszewski
Assistant Examiner—Kenneth Noland

[57] ABSTRACT

A materials handling vehicle, such as a turret stockpicker, is provided with control circuits and hardware to allow an operator to control the vehicle from either a standing or seated position while providing all of the safety interlocks that ensure proper operation of the vehicle. All functions of the vehicle, including raising and lowering of forks and moving the vehicle, are affected by the operator's position. The switch associated with the operator's seat indicates whether the operator is in the standing or seated position, and the control of the vehicle is appropriately modified to conform to industry standards according to the mode selected from the operator. An electronic circuit is responsive to an operator actuated seat switch to control the mode of operation wherein, a) if the operator is standing, floor operated switches control the braking of the vehicle, with braking being applied upon release of either of said switches, and b) if the operator is sitting, a pair of pedestal switches must both be activated to permit selected operations of the vehicle and lift truck functions, and wherein braking is controlled by the operation of a pedestal brake switch.

4 Claims, 5 Drawing Sheets

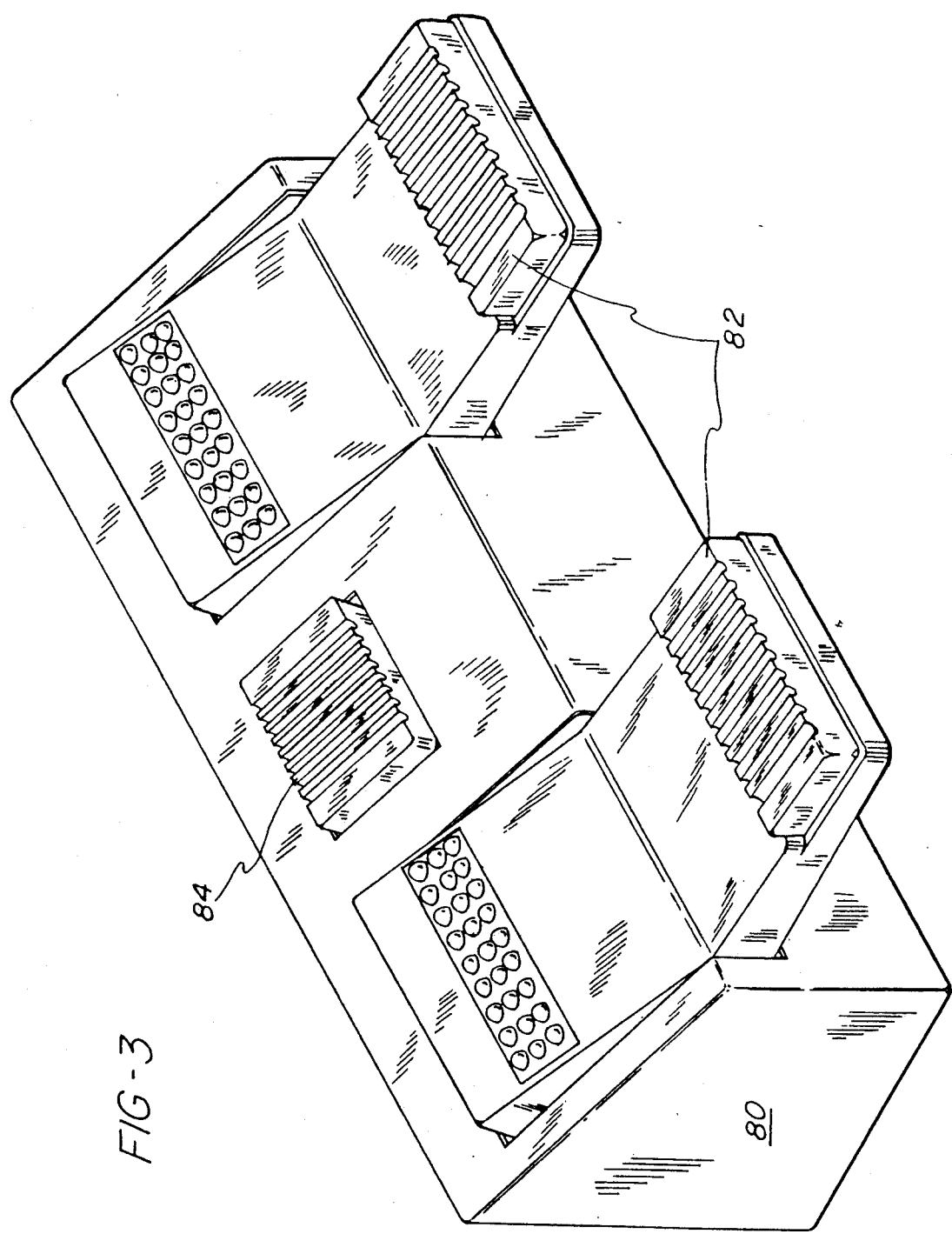

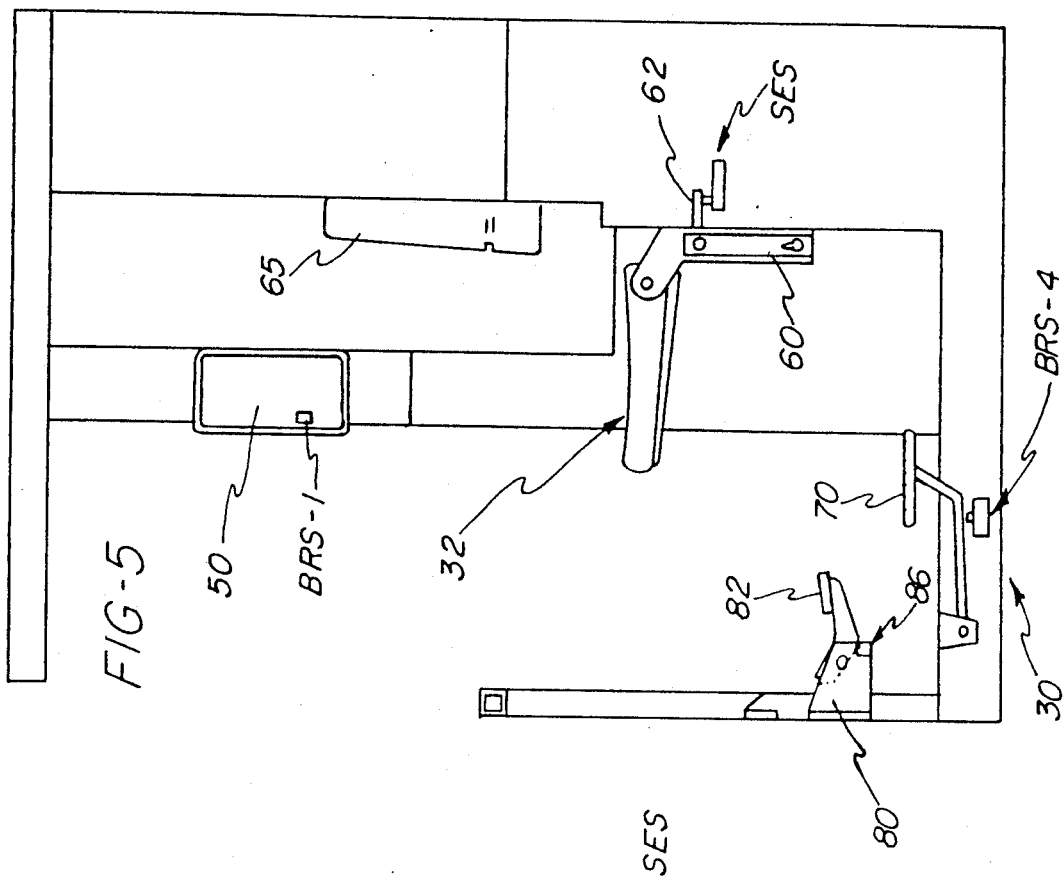
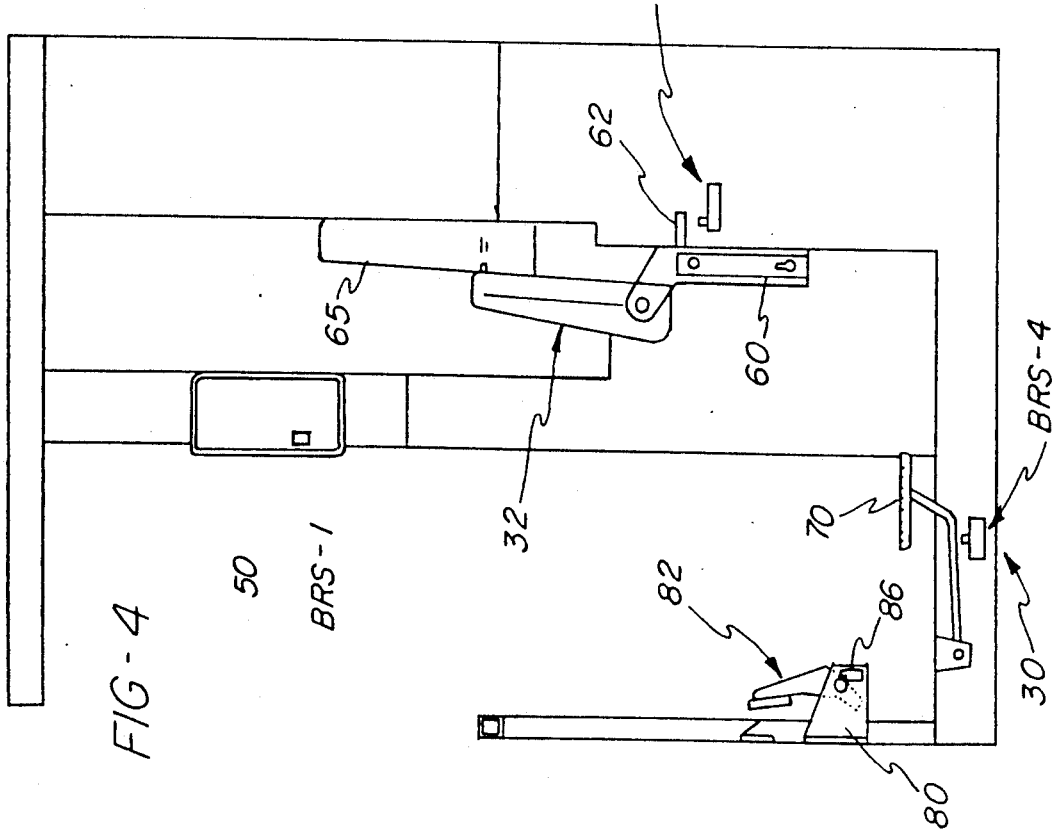

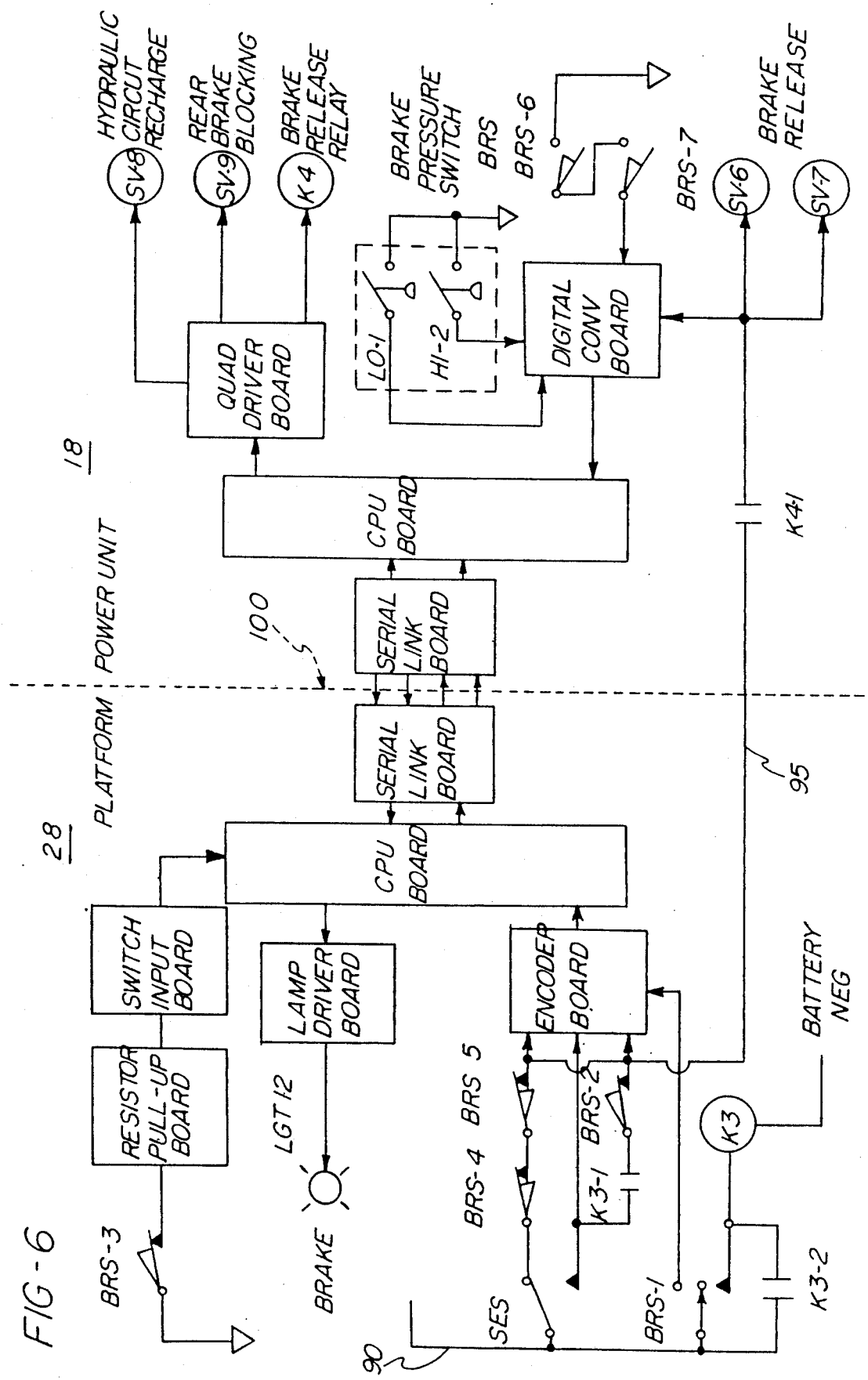

DUAL OPERATOR POSITION FOR MATERIAL HANDLING VEHICLE

BACKGROUND OF THE INVENTION

This invention relates to a materials handling vehicle, such as a lift truck, wherein the operator may operate the vehicle in either a standing or a sitting position.

In a prior art lift truck where the operator maneuvers the vehicle while in the standing position, such as a stock picker, safety considerations provide that the operator be properly positioned or located on the operator's platform. To release the brakes of the vehicle, the operator must step on the brake pedal which activates the brake and dead man switches. To brake the vehicle, the operator merely raises his feet, and that action will apply the brakes to bring the vehicle to a stop, and to hold the vehicle in place while the operator removes stock from a shelf to place it on the truck.

In other types of vehicles, such as pallet handling trucks, the operator is normally in a seated position during the operation of the vehicle. To ensure that the operator is in the proper position before permitting the vehicle to operate, the seat is provided with a weight actuated switch, and dead man switches are also provided to ensure that the operators feet are in the proper position. To brake the such a vehicle, the operator will remove his foot from one of the dead man switches, which causes the vehicle to coast, and places it on the brake pedal to control stopping.

Therefore, in a stock picker, the operator brakes the vehicle by releasing the floor pedal. In a pallet handling truck, on the other hand, a separate brake pedal is normally provided for braking, and dead man switches are provided to control the operation of the traction motors and other auxiliary functions, such as the operation of the forks. In both vehicles, means are provided to ensure that the operator is in the proper position before allowing the vehicle to move or other operations to be performed.

SUMMARY OF THE INVENTION

In the present invention, a turret stock picker allows the operator to control the vehicle from either a standing position using the traditional, industry accepted braking mode of operation or to operate the vehicle from a seated position, using somewhat different but also industry accepted operating procedures.

Specifically, in the present invention, a materials handling vehicle is provided with control circuits and hardware to allows the operator to control the vehicle from either a standing or seated position while providing all of the safety interlocks to ensure proper operation of the vehicle.

All functions of the lift truck, including raising and lowering the forks, and moving the vehicle, are affected by whether or not the operator is in the proper position. This invention includes means for sensing whether the operator is functioning in the stand up or the sit down mode, and the control of the vehicle is appropriately modified to conform to industry standards according to the mode selected by the operator.

It is therefore an object of this invention to provide a materials handling vehicle wherein the operator may operate the vehicle in either a standing or a sitting position.

It is a further object of this invention to provide an improved materials handling vehicle including an operator's seat, switch means associated with said seat for indicating when the operator is in the seated position, pedestal pedals mounted for operation by the operator when in the seated position, dead man switch means associated with a pair of said pedestal pedals for indicating when said pedals are depressed, and a brake switch associated with the third pedestal pedal, a pair of floor mounted pedals positioned to be operated when the operator is in the standing position, and switches associated with said floor mounted pedals for indicating when said floor pedals are depressed, and circuit means responsive to said seat actuated switch means wherein, a) if the operator is standing, the floor operated switches control the braking of the vehicle, with braking being applied upon release of either of said switches, and b) if the operator is sitting, the pedestal switches must both be activated to permit selected operations of the vehicle and lift truck functions, and wherein braking is controlled by the operation of said pedestal brake switch.

Other objects and advantages of the invention will be apparent from the following description, the accompanying drawings and the appended claims.

BRIEF DESCRIPTION OF THE DRAWINGS

FIG. 3 is a perspective view of the pedestal pedal assembly;

FIG. 4 is a side elevational view of the operator's platform configured for stand-up operation;

FIG. 5 is a side elevational view of the operator's platform configured for sit-down operation; and FIG. 6 is an electrical block diagram of the components of the platform and power unit necessary for operation of this invention.

DESCRIPTION OF THE PREFERRED EMBODIMENT

Figure 1:
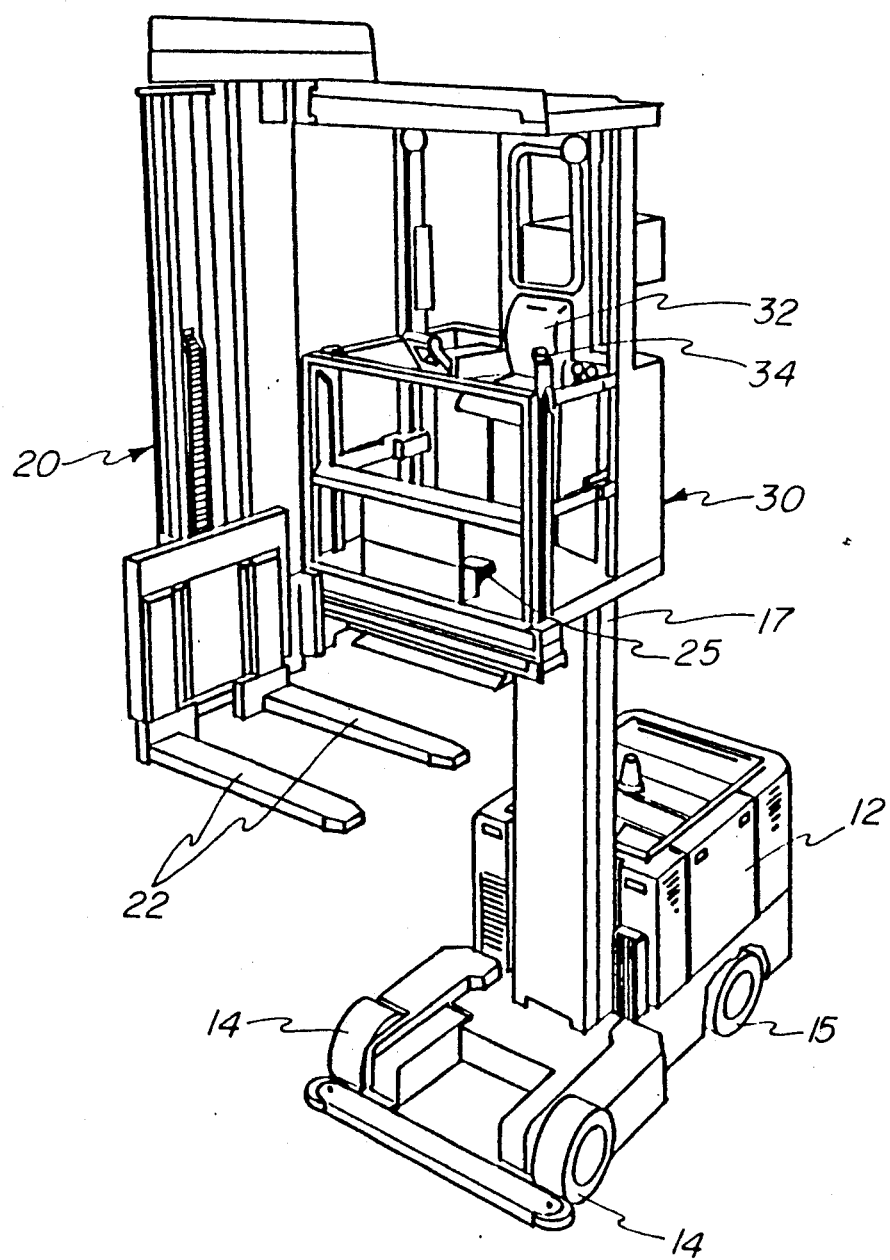
FIG. 1 is a perspective view of a materials handling vehicle, such as a turret stock picker of the type that provides for dual operator position.

Referring now to the drawings, and particularly to FIG. 1 which illustrates a materials handling vehicle, such as a turret stockpicker, the vehicle includes a power unit 10, a load handling assembly 20, and a platform assembly 30.

The power unit 10 includes a power source, such as a battery unit 12, a pair of load wheels 14 positioned under the platform assembly, a pair of steered wheels 15 positioned under the rear end of the power unit 10 with each wheel being driven by a traction motor, a mast 17 on which the platform assembly 30 rides, and a power unit electronic control unit 18 (FIG. 6). Both the load wheels 14 and the steered wheels 15 include spring applied brakes which are hydraulically released.

The load handling assembly 20 includes a pair of lift forks 22 which may be raised and lowered, and also rotated relative to the platform assembly.

Figure 2:
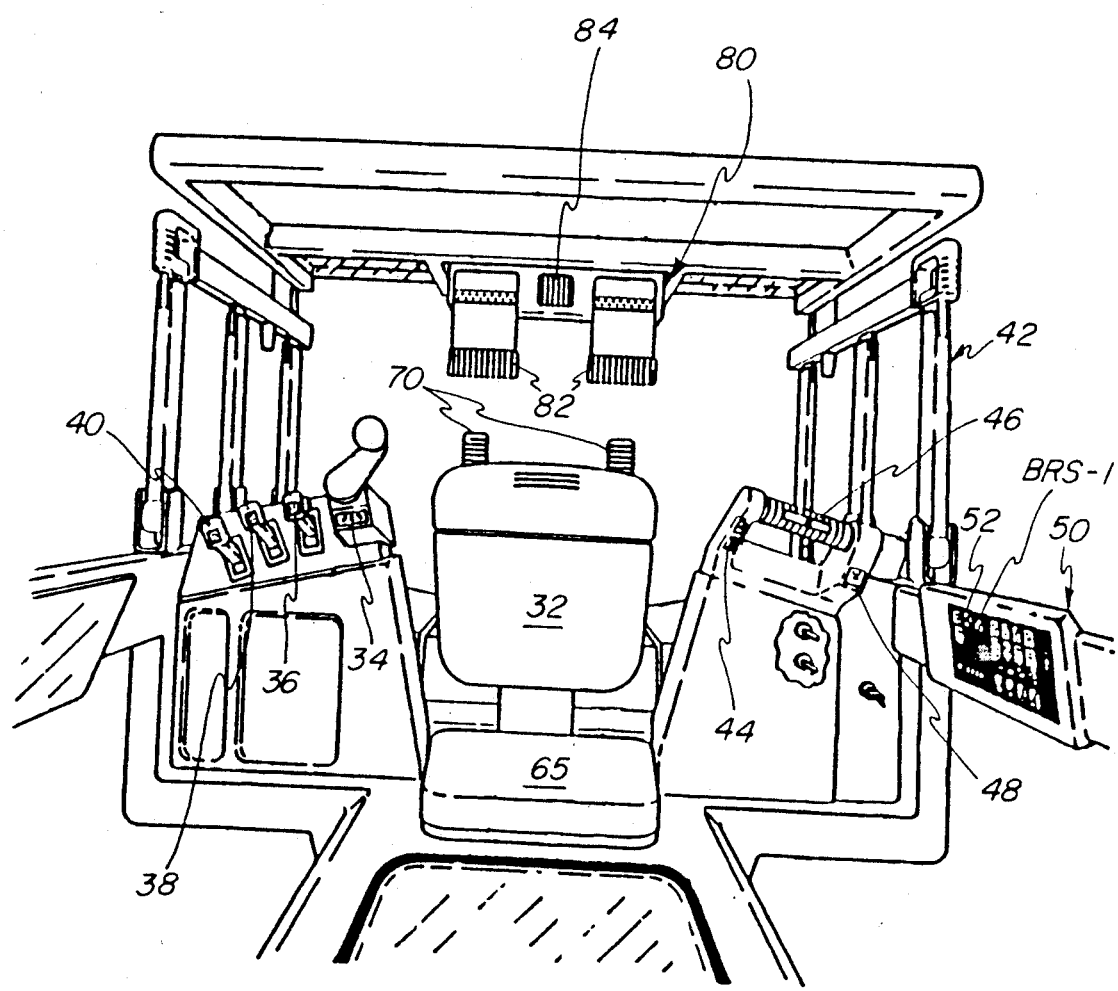
FIG. 2 is an plan view of the operator's platform.

The platform assembly 30, FIG. 2, includes a seat 32 from which the operator can operate various controls. On the left, the controls include a steering tiller 34, a fork raise and lower control 36, a fork traverse, retract and extend control 38, and a pivot control 40. On the right, the operator is provided with a traction motor control 42, which includes a horn switch 44, an accelerator twist grip and palm switch 46, and a power disconnect switch 48. An indicator control panel 50 to the right of the operator includes various indicator lamps, a guidance control switch 52, a parking brake switch BRS-1 and various accessory control switches. The parking brake switch BRS-1 is a three position switch, with the center being the released or neutral position which is the normal operating position. Moving the switch up applies the brakes. The switch may also be moved down against a spring to provide a momentary contact, as will be discussed.

The operator's seat 32 may be rotated or moved between a first or down position permitting the operator to be seated, as shown in FIG. 5, and a second or up position clear of interference when the operator is standing, as shown in FIG. 4. The seat is mounted on a spring loaded vertically moveable support arm 60 which is provided with an actuator arm 62 to operate switch SES, which indicates when the operator is seated. A seat back 65 is permanently attached to the platform assembly 30.

On the floor of the platform assembly 30 are a pair of brake pedals 70 for use when the vehicle is operated in the stand-up mode. Associated with these pedals are switches BRS-4 and BRS-5 for indicating when the pedals are depressed and are used to actuate the brakes. Also associated with these pedals are a pair of dead man switches which permit auxiliary functions to be performed only if closed.

Positioned in front of the seat 32, on a pedestal assembly 80 are a pair of dead man pedals 82, and a service brake pedal 84. A pair of switches are associated with each of the pedals 82 and a switch BRS-2 is associated with the brake pedal 84 for indicating when these pedals are depressed.

The pedestal pedals 82 are mounted for operation when the operator is in the seated position. These pedals are movable from a first or operating position, as shown in FIGS. 3 and 5, and a second or stowed position, as shown in FIG. 4, to allow more freedom of movement by the operator.

Referring to the simplified electrical block diagram of FIG. 6, the seat switch SES directs power from line 90 to either the series connected floor switches BRS-4 and BRS-5 or through relay contact K3-1 to the pedestal service brake switch BRS-2. These switches are connected to a common line 95 which is connected directly to brake release solenoids SV-6 and SV-7 through relay contacts K4-1. These solenoids apply hydraulic pressure to overcome the springs acting to apply the brakes. The switches BRS-4 and BRS-5 are normally open switches, switch BRS-2 is normally closed.

The pedestal pedal switches 86 provide input signals to the platform electronics package 28, which monitors the position of these and other switches and encoders to control the operation of the vehicle, the platform and the forks and to insure proper procedures are followed for safety purposes. The platform electronics package 28 sends data to the power unit electronics package via a serial link 100. Thus, there are two paths available for transmitting braking instructions from the platform to the power unit, namely, the serial link 100 and the signal on line 95.

The circuit shown in FIG. 6 is responsive to the seat actuated switch SES to determine whether the vehicle is to be operated in the stand-up or sit-down mode. If the operator is standing, the seat switch SES will be in the position shown, and battery voltage on line 90 will be applied directly to the floor pedal brake switches BRS-4 and BRS-5. If these switches are closed, that is, if the operator is standing on the pedals 70, then the battery voltage will be applied through relay contacts K4-1 to activate the brake release solenoids SV-6 and SV-7. Relay K4 is normally energized, except when the parking brake switch BRS-1 is operated or some other function of the power unit control circuit (not part of the present invention) requires the brakes to be applied. If the operator releases either brake pedal, the switches BRS-4 or BRS-5 will open, the brake release solenoids deactivated, and the vehicle will be stopped.

On the other hand, if the operator is seated, the seat switch SES close and battery voltage will be applied to relay contacts K3-1. Relay K3 is energized by operation of the parking brake switch BRS-1, when moved to the momentary down position, and this in turn causes normally open contacts K3-1 and K3-2 to close. Contacts K3-2 provide a latching circuit in parallel to the momentary contacts of the parking brake switch. Contacts K3-1 supply battery power to the pedestal brake switch BRS-2. With the operator in the seat and the relay K3 energized, the brake release solenoids will be energized. Pressing on the brake pedal 84 will open the circuit through switch BRS-2 and deenergize the brake release solenoids, causing the brakes to be applied.

Although not part of the present invention, the position of the steered wheel brakes are monitored by switches BRS-6 and BRS-7, and the pressure in the hydraulic system that actuates the brakes is monitored by brake pressure switches LO-1 and Hi-2.

The position of the operator's feet when the vehicle while seated determines which operations are possible. If the pedestal pedal switches or dead man switches 82 are not depressed after the seat switch senses the operator's weight, then no auxiliary function will be permitted. The sequence of the operation of the switches is sensed by the electronics package in the platform and insures that the safety interlocks are not avoided.

If the operator stands up, thus releasing the seat switch, the floor pedals immediately become operational and the pedestal switches will become non-operational. On the other hand, if the operator has been operating the vehicle while standing and now wishes to continue operation from the seated position, then the parking brake switch BRS-1 must be pressed down momentarily and then returned to the neutral or center position. The brakes will be released, the floor switches will be rendered inoperative, and the vehicle may then be moved, but no auxiliary functions can be performed unless the dead man switches associated with the pedestal pedals 82 are also closed.

Thus the present invention provides an improved materials handling vehicle wherein the operator may operate in either the stand-up mode or the sit-down mode and the industry standard operating procedures for each mode are maintained.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A materials handling vehicle wherein the operator may operate the vehicle in either a standing or a sitting position, said vehicle including an operator's seat, switch means associated with said seat for indicating when the operator is in the seated position, pedestal pedals mounted for operation by the operator when in the seated position, dead man switch means associated with a pair of said pedestal pedals for indicating when said pedals are depressed, a a brake switch associated with the third pedestal pedal, a pair of floor mounted pedals positioned to be operated when the operator is in the standing position, and switches associated with said floor mounted pedals for indicating when said floor pedals are depressed, and circuit means responsive to said seat actuated switch means wherein, a) if the operator is standing, the seat actuated switch means is released, the floor operated switches control the braking of the vehicle, with braking being applied upon release of either of said switches, and b) if the operator is sitting, the pedestal switches must both be activated to permit selected operations of the vehicle and lift truck functions, and wherein braking is controlled by the operation of said pedestal brake switch.

2. The vehicle of claim 1 wherein said seat is movable between a first or down position where the operator can be seated, and a second or up position clear of interference with the operator when the operator is standing.

3. The vehicle of claim 1 wherein said pedestal pedals associated with said dead man switches are moveable between a first or operating position and a second or stowed position.

4. The vehicle of claim 1 further including safety interlock means for permitting the operation of selected functions of the vehicle when the operator has operated selected interlock switches.

* * * * *

UNITED STATES PATENT AND TRADEMARK OFFICE
CERTIFICATE OF CORRECTION

PATENT NO. : 5,044,472

DATED : September 3, 1991

INVENTOR(S) : Ned E. Dammeyer and Harold A. Stammen

It is certified that error appears in the above-identified patent and that said Letters Patent is hereby corrected as shown below:

Column 1, line 27 delete "the" first occurrence.

Column 3, line 4, after "being" insert --in--.

Column 4, line 9, "deactivated" should be --deactivates--.

Column 4, line 11, "close" should be --closes--.

Column 4, line 30, after "when" insert --operating--.

Signed and Sealed this

Second Day of March, 1993

Attest:

STEPHEN G. KUNIN

*Attesting Officer*   *Acting Commissioner of Patents and Trademarks*